June 10, 1969  J. H. RUMBARGER  3,448,632
SELF-ADJUSTING HYDROSTATIC LEAD SCREW AND NUT ASSEMBLY
Filed Nov. 15, 1967
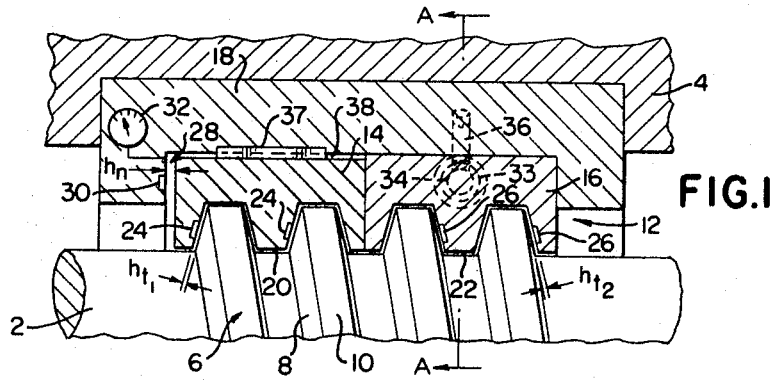
FIG.1
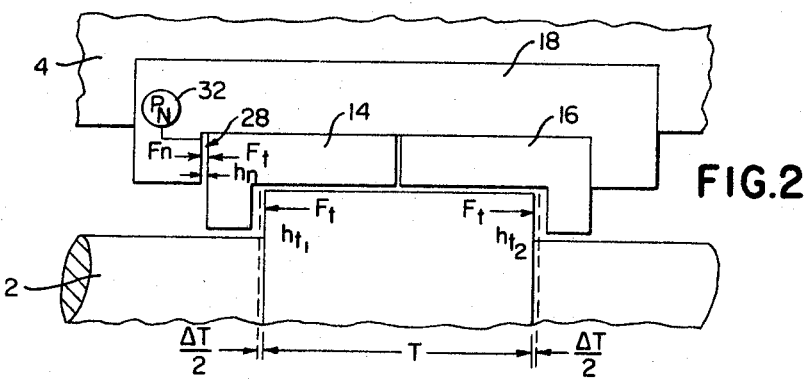
FIG.2
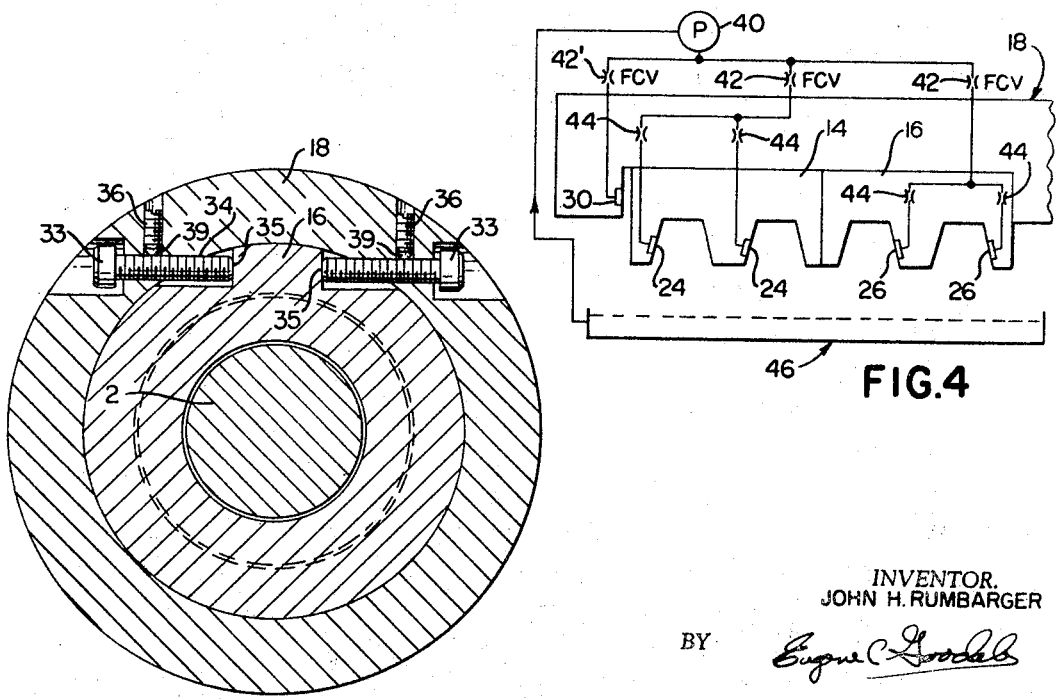
FIG.3
FIG.4
INVENTOR.
JOHN H. RUMBARGER
BY Eugene C. Goodale
ATTORNEY 3,448,632
SELF-ADJUSTING HYDROSTATIC LEAD
SCREW AND NUT ASSEMBLY
John H. Rumbarger, Wayne, Pa., assignor, by mesne assignments, to Scully International Corporation, Downers Grove, Ill., a corporation of Illinois
Filed Nov. 15, 1967, Ser. No. 683,204
Int. Cl. F16h 1/20
U.S. Cl. 74—424.8                                                                 10 Claims

ABSTRACT OF THE DISCLOSURE

A lead screw and nut assembly in which externally pressurized fluid is pumped into the assembly to completely separate the nut assembly from the lead screw thus preventing any metal-to-metal contact. The assembly provides resultant fluid film forces acting in opposite directions on respective nuts of the assembly and an external hydrostatic thrust bearing outside one nut supports the nut load.

Background of the invention

This invention pertains to precision lead screw and nut assemblies and more particularly to a hydrostatic lead screw and nut assembly with self-adjusting fluid film clearances.

In machine tools, gages and instruments for checking precision parts, it is necessary to precisely move one member relative to another. In such cases, lead screw and nut assemblies are often used. It is known that it is difficult to machine perfect interfitting threads on a screw and nut, and even if this were possible, ordinary wear would soon occur and inaccuracies would soon develop. It is essential in these precision machines, however, that there is no play in the lead screw and nut assembly and prior attempts to gain this precision have failed.

An attempt to overcome the inherent problems associated with lead screw and nut assemblies was the use of hydrostatic fluid pressure between the lead screw and nut to prevent metal-to-metal contact.

Such hydrostatic lead screw and nut assemblies should have high mechanical stiffness (small displacement of the screw axially with respect to the nut under heavy load) with reasonable fluid pressure and flow. These requirements dictate that the tooth fluid film thickness should be kept as small as practically possible.

It has been found that lead screws and nuts have many errors such as tooth-to-tooth spacing, tooth thickness and accumulated lead error. All of these inaccuracies, evident to some extent even in precision parts, will limit the minimum film thickness which may be maintained in hydrostatic lead screw and nut assemblies as the screw traverses through the nut. The present invention provides a hydrostatic lead screw and nut assembly with a self-adjusting fluid film clearance feature which will allow the fluid film to be set to a much smaller minimum thickness than possible with machined and predetermined clearances and also allows lead screw error evaluation, if desired. Thus, as the screw traverses through the nut, fluid film thickness is automatically adjusted to compensate for tooth-to-tooth errors.

Summary of the invention

A hydrostatic lead screw and nut assembly is provided wherein pressurized fluid, supplied between complementary surfaces, prevents metal-to-metal contact. The nut assembly comprises dual nuts having fluid pockets formed in a threaded face but on opposite sides as respects a common thread so as to effectively provide resultant axial thread forces in opposite directions. Use of dual nuts permits initial adjustment of the fluid film thickness to any desired amount through relative rotation. Independent thrust means provide an axial reaction force against the nut assembly so at to normally maintain the nuts in abutting relationship during normal operation and support the nut load. Changes in fluid film thickness resulting from tooth-to-tooth error, for example, a thicker tooth, produce changes in the resultant thread forces sufficient to cause one of the nuts to move against the thrust means until an equilibrium position is reached within the nut and tooth hydrostatic system. Measurement of the axial reaction force allows evaluation of the errors in the lead screw.

Description of the drawings

An illustrative embodiment of the present invention is shown in the following drawings, in which FIG. 1 is a partly diagrammatic, part sectional view of the lead screw and nut assembly, FIG. 2 is a schematic showing the principle of operation, FIG. 3 is a section along A—A of FIG. 1, and FIG. 4 is a schematic of an exemplary fluid system of a multi-pad assembly.

Detailed description of the invention

In an illustrative embodiment of the present invention as seen in FIG. 1, a lead screw 2, which may be journalled on a machine and adapted to be rotated to move a carriage, partially shown at 4, has a helical thread 6 thereon and is of the acme type having inclined radial surfaces 8 and axial crest surfaces 10.

The nut assembly connecting carriage 4 and lead screw 2 is shown generally at 12 and comprises dual nut members 14 and 16 and a retaining frame 18 holding the nuts for limited axial movement relative to the frame. Nuts 14 and 16 each have a complementary helical thread 20 and 22, resepectively, formed thereon for engagement with lead screw thread 6.

A plurality of circumferentially spaced fluid pressure pockets or pads 24 are provided along one of the inclined radial surfaces of thread 20 in nut 14 while thread 22 of nut 16 has similarly spaced pressure pockets or pads 26 provided but on the opposed inclined radial surface as respects a common thread. As seen in the exemplary schematic of FIG. 4, a pump 40 provides a continuous flow of fluid through flow control valves 42 to each pressure pocket in nuts 14 and 16. An orifice, as indicated generally at 44, may be associated with each supply line leading to each pressure pocket. A hydrostatic fluid film thus exists between the lead screw thread and the side of the nut helical thread having the pressure pockets therein. A sump 46 collects the fluid escaping from assembly 12 and serves to replenish pump 40.

The thickness of the fluid film is designated $h_{t_1}$ and $h_{t_2}$ respectively for nuts 14 and 16. The resultant axial forces from the hydrostatic film of each nut acts in opposite directions and tends to urge each nut in axially opposite directions along lead screw 6. It is seen that nut 16 is in abutting relationship with frame 18 and is fixedly held thereto by the resultant axial force from pockets 26. Thus, nut 16 has no axial movement relative to frame 18 during operation.

An external hydrostatic thrust bearing outside of nut 14 and supporting the nut load and having a film thickness $h_n$ is shown generally at 28. The fluid pressure pocket or pad 30 may either be provided in the nut 14 or in the retaining frame 18 as is shown in this embodiment. Pump 40 provides a continuous flow of fluid through flow control valve 42' to the pressure pocket 30. Thrust bearing 28 provides an axial reaction force greater than the resultant force from pockets 24 in nut 14 to maintain nut 14 in abutting relationship with nut 16 during normal operation and in the absence of any lead screw errors.

Each nut has a hydrostatic fluid film relative thereto with a resultant axial force acting on only one of its faces so that rotation of one nut with respect to the other will provide for initially adjusting of the fluid film thickness $h_t$ to any desired amount in the assembly. Any suitable means, such as radial set screws, may be used to prevent rotary movement of the nut members after initial film thickness adjustment. An exemplary configuration for adjusting the film thickness and preventing the rotary movement of the nut member after the initial film thickness has been adjusted is shown in FIG. 3. Two screws 33 are threaded through the frame 18 and engage nut 16 at opposing surfaces 35. Set screws 36 are used to lock screws 33 by applying pressure to screws 33 through a suitable plug 39, such as a copper plug which will not damage the threads on screws 33. Nut 14 has a longitudinal keyslot 38 formed therein. Key 37, which is attached to frame 18 and fits within keyslot 38, permits longitudinal movement of nut 14 while preventing rotation of nut 14. Thus, by adjusting screws 33 the nut 16 may be adjusted in either rotary direction. This shows one configuraion for rotating nut 16 with respect to nut 14 to provide for initial oil film thickness adjustment within the nuts. While in the exemplary illustrated embodiment nut 16 is rotationally adjustable and nut 14 is keyed for longitudinal movement, other variations are possible within the scope of this invention as by fixing nut 16 and providing for rotational adjustment and longitudinal guiding in nut 14.

Hydrostatic thrust bearing 28 provides the self-adjusting feature for compensation of tooth-to-tooth errors. This principle of operation will be best explained by referring to the schematic of FIG. 2.

In a hydrostatic fluid film bearing, the fluid film load is inversely proportional to the cube of the fluid film thickness. Hence, if $Q=$Constant Flow, then $$F_t \sim Q/h_t^3$$

and $$F_n \sim Q/h_n^3$$

Thus a small decrease in film thickness will result in a very large increase in hydrostatic pocket or pad load. Assume for our example that $F_n=10F_t$ so that the nuts are held by the frame with a force much greater than the nut film loads on the lead screw teeth. Then, for example, in an increase in tooth thickness T of 75% of the available film clearance should occur due to geometric errors:

$$\Delta T=0.75(h_{t_1}+h_{t_2})$$

The lead screw under no external load would tend to center itself relative to the nuts.

$$\Delta h_{t_1}/h_{t_1}=\Delta h_{t_2}/h_{t_2}=0.75/2=0.375$$

If the screw is under external load, the same principle will apply except that the difference of the two internal hydraulic pad loads and the teeth will be equal to the applied external load.

The change in $F_t$ due to a 37.5% change in each tooth film clearance will be:

$$\Delta F_t/F_t=(h_t)^3/(\Delta h_t)^3=1/(0.375)^3=19$$

Thus almost a twenty-fold increase in tooth loads would develop. These increased hydraulic loads would cause nut 14 to move, thus increasing the total gap $(h_{t_1}+h_{t_2})$. The movement of nut 14 will decrease the fluid film $h_n$ which in turn will increase the reaction or nut holding force $F_n$. Thus an equilibrium position will be reached within the nut and tooth hydrostatic system. When the increased tooth thickness error $\Delta T$ decreases, nut 14 will again move back against nut 16.

This principle will allow unusually large lead screw errors to be accommodated automatically without any metal-to-metal contact and subsequent wear and high friction and without any significant decrease in the system stiffness.

As an example, if a lead screw tooth 6 of increased thickness should enter nut 14 from the left, fluid film thickness $h_{t_1}$ will be decreased and the resultant axial force $F_t$, acting on nut 14 will be increased and urge nut 14 to the left against the reaction force $F_n$, of the hydrostatic bearing 28. The movement of nut 14 will then decrease the oil film, $h_n$, increasing the reaction force, $F_n$, until an equilibrium position is reached in the hydrostatic systems.

When the tooth passes beyond nut 14, the film thickness $h_{t_1}$ will increase and the resultant axial force $F_t$ acting on nut 14 will decrease thus allowing the reaction force $F_n$ to urge nut 14 back to the original position.

However, the increased tooth has now entered nut 16 causing a decrease in fluid film thickness $h_{t_2}$. The resultant axial force $F_t$ acting on nut 16 will be increased and transmitted through nut 16 to frame 18 causing an even greater reaction force $F_n$ and frame 18 will tend to move to the right. The movement of frame 18 and increased reaction force $F_n$ will urge nut 14 to the right decreasing film thickness $h_{t_1}$ and increasing the corresponding resultant force until an equilibrium position is reached.

As the tooth leaves nut 16, the film thickness $h_{t_2}$ will increase, thereby reducing the corresponding resultant axial force and hence reducing the reaction force $F_n$ and frame 18 and nut 16 will be urged to the left by the resultant force acting on nut 14 until the hydrostatic systems are again in equilibrium.

It can be seen that the same compensation will occur for threads of decreased thickness since in either condition, one fluid film thickness will be decreased relative to the other fluid film in the two nut to lead screw hydrostatic systems. Although the exemplary illustrated embodiment shows the hydrostatic thrust bearing 28 acting only at one end, the same self-adjustment would occur if hydrostatic thrust bearing were located at the outer ends of both nuts 14 and 16; or if the effective direction of the pressure pads or pockets were reversed and the thrust bearing located between and separating the nuts.

Another important feature of this self-adjusting principle is the ability to use the system for rapid evaluation or inspection of the combined errors in a lead screw. The variations in tooth thickness or lead error which cause a decrease in the nut film clearance $h_n$ will also cause an increase in the fluid pressure $P_n$ (p.s.i.) in the nut to frame hydrostatic thrust bearing 28 which may be shown on any conventional pressure indicator 32. Thus changes in the pressure $P_n$ will show changes in spacing within the screw and nut assembly. For inspection purposes the nut force, $F_n$, may be made equal to the tooth forces $F_t$ providing increased sensitivity. The pressure $P_n$ is directly proportional to the pad load, $F_n$, but inversely proportional to the cube of the film clearance change thus providing large observable pressure changes for small differences in film clearance.

It is to be understood, that although circumferentially spaced pressure pockets or pads have been described, the pressure pockets could as well be formed as a single helical groove supplied with a pressurized fluid.

Further, it is obvious that this invention is not restricted to acme type threads but is equally applicable to other thread forms. For instance, if a square type thread is used, pressure pockets or pads are provided on both the radial and axial surfaces of the thread. The axial pockets or pads would then support the nut relative to the lead screw.

While the forms of apparatus herein described constitute preferred embodiments of the invention, it is to be understood that the invention is not limited to these precise forms of apparatus and that changes may be made therein without departing from the scope of the invention which is defined in the appended claims. What is claimed is:

1. A lead screw and nut assembly comprising
    a lead screw,
    a pair of nut members having complementary thread surfaces mounted for relative axial movement along said lead screw,
    a frame for retaining said nut members in end-to-end relationships and limiting axial movement of said nut members relative thereto,
    first hydrostatic bearing means between complementary thread surfaces of said first nut member and said lead screw on one side as respects a common thread providing a first resultant axial force in one direction,
    second hydrostatic bearing means between complementary thread surfaces of said second nut member and said lead screw on the opposite side as respects a common thread providing a second resultant axial force in the opposite direction,
    and yieldable compensating means effectively acting on both said nut members in opposition to each of said resultant axial forces providing automatic hydrostatic bearing film adjustment to accommodate lead screw error thereby providing a fluid film between said complementary surfaces at all times.

2. A lead screw and nut assembly as set forth in claim 1 further comprising,
    means mounting said first nut member for rotary adjustment and positioning relative to said lead screw and said second nut member, whereby rotation of said first nut member relative to said second nut member will allow the fluid film thickness of said hydrostatic bearing means to be initially adjusted to any desired amount in said assembly, and
    means retaining said nut members against relative rotation after said initial adjustment.

3. A lead screw and nut assembly as set forth in claim 1 in which said yieldable compensating means comprises,
    said yieldable compensating means acting between said frame and said second nut member providing an axial reaction force of constant magnitude reacting through said frame to oppose said first and second resultant axial forces,
    said first and second hydrostatic bearing resultant axial forces being inversely proportional to the respective bearing film thickness wherein decreases in film thickness due to lead screw error provide increased resultant axial forces acting on said nut members in opposition to said reaction force whereby said second nut member moves axially on said lead screw relative to said frame and against said reaction force to a position wherein equilibrium of forces is reached within said hydrostatic system.

4. A lead screw and nut assembly as set forth in claim 3 further comprising indicating means responsive to said yieldable means providing an indication of changes in spacing within said lead screw and nut assembly.

5. A lead screw and nut assembly as set forth in claim 3 in which said yieldable means further comprises a third hydrostatic bearing means.

6. A lead screw and nut assembly as set forth in claim 5 further comprising pressure indicating means communicating with said third hydrostatic bearing providing an indication of pressure within said third hydrostatic bearing whereby changes in pressure in said third hydrostatic bearing are responsive to and indicate changes in fluid film thickness within said lead screw and nut assembly.

7. A lead screw and nut assembly as set forth in claim 1 in which said compensating means further comprises,
    hydrostatic thrust means effectively acting between said frame and said nut members providing an axial reaction force of constant magnitude reacting in opposition to said first and second resultant axial forces,
    said first and second hydrostatic bearing resultant axial forces being inversely proportional to the respective bearing film thickness wherein decreases in film thickness due to lead screw error provide increased resultant axial forces acting on said nut members in opposition to said reaction force whereby said second nut member moves axially on said lead screw relative to said frame and against said reaction force to a position wherein equilibrium of forces is reached within said hydrostatic system.

8. A lead screw and nut assembly comprising,
    a lead screw,
    a pair of nut members having complementary thread surfaces mounted for relative axial movement along said lead screw,
    a frame for retaining said nut members in end-to-end relationship and limiting axial movement of said nut members relative thereto,
    first hydrostatic bearing means between complementary thread surfaces of said first nut member and said lead screw on one side as respects a common thread providing a first resultant axial force in one direction,
    second hydrostatic bearing means between complementary thread surfaces of said second nut member and said lead screw on the opposite side as respects a common thread providing a second resultant axial force in the opposite direction,
    means mounting one of said nut members for rotary adjustment and positioning relative to the other nut member whereby the fluid film thickness of said first and second hydrostatic bearing means can be initially adjusted to any desired amount in said assembly,
    and means retaining said nut members against relative rotation after said initial adjustment.

9. A lead screw and nut assembly comprising,
    a lead screw,
    a pair of nut members having complementary thread surfaces mounted for relative axial movement along said lead screw,
    a frame for retaining said nut members in end-to-end relationship and limiting axial movement of said nut members relative thereto,
    first hydrostatic bearing means between complementary thread surfaces of said first nut member and said lead screw on one side as respects a common thread providing a first resultant axial force in one direction urging said first nut member against said frame,
    second hydrostatic bearing means between complementary thread surfaces of said second nut member and said lead screw on the opposite side as respects a common thread providing a second resultant axial force in the opposite direction urging said second nut member towards said frame,
    third hydrostatic bearing means acting between said frame and said second nut providing automatic hydrostatic bearing film adjustment to accommodate lead screw error thereby providing a fluid film between said complementary surfaces at all times.

10. A lead screw and nut assembly comprising,
    a lead screw,
    a pair of nut members having complementary thread surfaces mounted for cooperative engagement with said lead screw,
    a frame for retaining said nut members in end-to-end relationship on said lead screw and for limited free relative axial movement therealong,
    first hydrostatic bearing means between complementary thread surfaces of said first nut member and said lead screw on one side as respects a common thread providing a first resultant axial force in one direction,
    second hydrostatic bearing means between complementary thread surfaces of said second nut member and said lead screw on the opposite side as respects a common thread providing a second resultant axial force in the opposite direction, and third hydrostatic bearing means effectively acting on both said nut members in opposition to each of said resultant axial forces providing automatic hydrostatic bearing film adjustment to accommodate lead screw error thereby providing a fluid film between said complementary surfaces at all times.

References Cited

UNITED STATES PATENTS

| | | | |
|---|---|---|---|
| 3,183,732 | 5/1965 | Porath | 74—424.8 |
| 3,271,086 | 9/1966 | Deffrenne | 308—9 X |
| 3,323,385 | 6/1967 | Revitt | 74—468 X |
| 3,331,469 | 7/1967 | Deflandre | 74—424.8 X |
| 3,361,003 | 1/1968 | Hodgson | 74—468 X |

DONLEY J. STOCKING, *Primary Examiner.*

L. H. GERIN, *Assistant Examiner.*

U.S. Cl. X.R.

74—409, 441, 468; 308—9, 122